Aug. 24, 1965   L. J. ARP ETAL   3,202,895
AUTOMATIC TAPED PROGRAM CONTROL APPARATUS FOR A MACHINE TOOL
Filed Jan. 31, 1962   4 Sheets-Sheet 1

Fig. 1

INVENTORS
LEON J. ARP
JOHN M. GREEN
BY Lowell & Henderson
ATTORNEYS

WITNESS
NORMAN G. TRAVISS

Aug. 24, 1965 L. J. ARP ETAL 3,202,895
AUTOMATIC TAPED PROGRAM CONTROL APPARATUS FOR A MACHINE TOOL
Filed Jan. 31, 1962 4 Sheets-Sheet 4

Fig. 2C

INVENTORS
LEON J. ARP
JOHN M. GREEN
BY Lowell & Henderson
ATTORNEYS

WITNESS
NORMAN G. TRAVISS

United States Patent Office 3,202,895
Patented Aug. 24, 1965

3,202,895
AUTOMATIC TAPED PROGRAM CONTROL APPARATUS FOR A MACHINE TOOL
Leon J. Arp and John M. Green, Ames, Iowa, assignors to Iowa State University Research Foundation, Inc., Ames, Iowa, an association of Iowa
Filed Jan. 31, 1962, Ser. No. 170,197
4 Claims. (Cl. 318—162)

This invention relates generally to apparatus for the control of movable elements of any type, and more particularly to apparatus for effecting the automatic positioning of a movable element of a machine tool in accordance with a previously recorded program, and without manual resetting of the apparatus.

It is an object of this invention to provide a new and novel automatic control apparatus for the positioning of a movable element.

It is another object of this invention to provide a new and novel apparatus for the automatic control of the operation of a machine tool.

Another object of this invention is to provide a new and novel control apparatus capable of controlling the operation of a machine tool automatically to the extent that a preselected series of operations are performed without manual intervention.

Yet another object of this invention is to provide for the positioning of a movable element of a machine tool relative to a work piece with a high degree of accuracy, by automatic control apparatus which is simple, inexpensive, of few components all of which are standard, is readily portable, and which can be easily serviced by technician-type personnel.

Still another object of this invention is to provide a new and improved circuit for automatically controlling the operation of a machine tool according to information supplied the apparatus from a program without the need for a computer.

A further object of this invention is to provide control apparatus capable of translating movement of a machine tool element into a number based on element movement time as compared to absolute time, the number adapted for comparison to a program-provided reference number to effect a signal capable of control use.

Yet another object of this invention is to provide, for a machine tool moved by a gear train-operated lead screw, apparatus which measures the amount of movement of a machine tool element independently of the gear train movement, and which translates the measurement into a number which may be compared to a reference number supplied by a program.

Another object of this invention is to provide apparatus capable of attaining the above designated objectives which can be readily installed on existing machine tool equipment.

These objects, and other features and advantages of this invention will become readily apparent by reference to the following description and the accompanying drawings, wherein:

FIG. 2 is drawn on three sheets labeled FIG. 2A, FIG. 2B, and FIG. 2C. The sheets are placeable side-by-side in alphabetical order from left to right to obtain the composite FIG. 2.

Referring to the drawing, our automatic control apparatus is illustrated in conjunction with a machine tool of a lathe type wherein the apparatus is utilized to move a cutting tool element longitudinally and/or laterally with respect to a stationary but otherwise rotating work piece in such manner that the work piece will be cut to a desired shape. It may readily be appreciated that the apparatus can also be utilized to move the work piece relative to the cutting tool to accomplish the same result.

Figure 1:
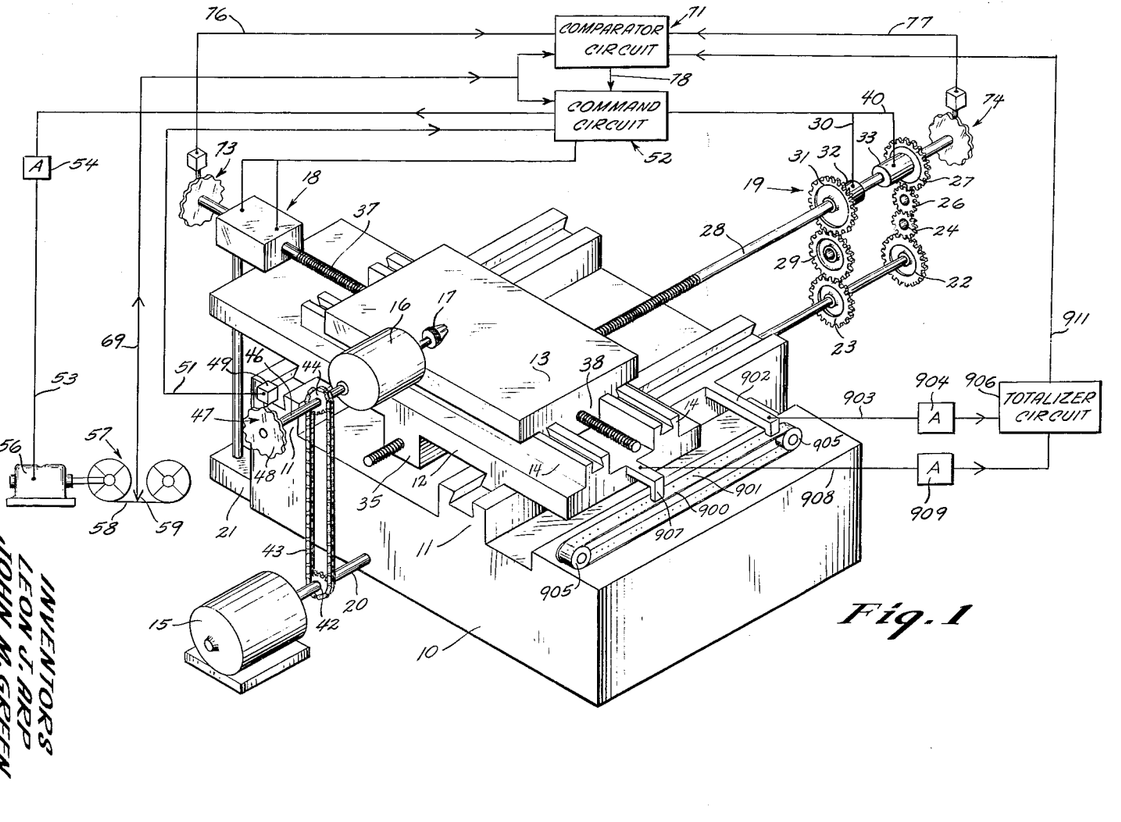
FIG. 1 is a schematic showing of the machine tool and the automatic control apparatus therefor.

In FIG. 1, a base 10 is provided for supporting a pair of dovetail members 11 affixed to the base 10 and which in turn support a table 12 for movement longitudinally of the base 10. A carriage 13 is movably mounted on another pair of dovetail members 14 affixed to the table 12 for movement transversely of the base 10. A rotary spindle 16 provided with a work piece holding chuck 17 is arranged through suitable drive means to drive the chuck 17 at a selected speed.

The carriage 13 is adapted to support one or more cutting tools (not shown). Thus, by varying the longitudinal and lateral movement of the tool-holding carriage 13, the work piece can be cut to any desired shape.

To provide power for operating a pair of drive mechanisms, indicated generally at 18 and 19 in FIG. 1, a motor 15 is provided, and which rotates a drive shaft 20 journaled in the base 10. As each drive mechanism is identical, with the exception of mechanism 18 receiving drive through a shaft and gear train 21 driven off the drive shaft 20 in the manner of lathe gearing, only drive mechanism 19 is illustrated in detail and will be described hereinafter. It is to be remembered therefore, that everything described as to drive mechanism 19 pertains also to drive mechanism 18. The driving connection between the shaft 20 and the gear train 21 is such that the latter moves longitudinally of the shaft 20 in accord with and upon movement of the table 12 relative to the base 10.

A pair of drive gears 22 and 23 are mounted on the end of the drive shaft 20 opposite the motor 15. Drive gear 22 is in constant mesh with gear 24, and gear 24 with gear 26 with the latter gear 26 in driving engagement with gear 27 which is rotatably mounted on a lead screw 28. The other drive gear 23 is in constant mesh with gear 29 which in turn meshes with gear 31 rotatably mounted on the lead screw. It can readily be ascertained by the arrangement thus far, that with unidirectional movement of the drive shaft 20, lead screw gears 27 and 31 rotate in opposite directions to each other.

A pair of magnetically actuated clutch devices 32 and 33 are mounted in spaced relation on the lead screw 28. Each device 32 and 33 is operable, upon the energization respectively of either of a pair of solenoids 34 and 36 (FIG. 2), to lock a respective lead screw gear 27 and 31 to the lead screw 28. Thus, for example, should clutch device 32 be actuated, the rotational drive of gear 31 would be transmitted to the lead screw 28.

As the longitudinal lead screw 28 acts with a threaded member 35 affixed to the underside of the carriage 13 to move the carriage toward or away from the spindle chuck 17, actuation of the clutch devices 32 and 33 determines the direction of movement of the carriage 13 toward or away from the work piece. Similarly with the transverse lead screw 37 (FIG. 1) which acts with threaded member 38 to provide for movement of the table 13 transversely of the spindle chuck 17, actuation of either of a pair of clutch devices (not shown) in the gear mechanism 18 by energization of either of a pair of solenoids 39 and 41 (FIG. 2) determines the direction of movement of the table 12.

The portions of the machine so far described are conventional, and no claim of invention is made to these portions alone. In such a typical arrangement of longitudinal and transverse lead screws for moving a cutting tool and a work piece relative to each other, it is desirable under certain circumstances to obtain as complete an automatic control of the machining operation as possible. Such is achieved by the following apparatus.

Attached to the drive shaft 20 for rotation therewith is a toothed wheel 42 (FIG. 1) which rotates via a chain 43 another wheel 44 attached to the spindle shaft 46 at the other end of which is mounted the chuck 17. Thus, the rotation of the spindle shaft 46 and the chuck 17 is directly proportional to the rotational speed of the drive shaft 20. At the outer end of the spindle shaft 46 is a rotary switch 47 comprising a cam wheel 48 having a plurality of notches about its periphery, and an on-off switch 49 engageable with the notched periphery for making and breaking the circuit in response to rotation of the cam wheel 48.

Figure 2A:
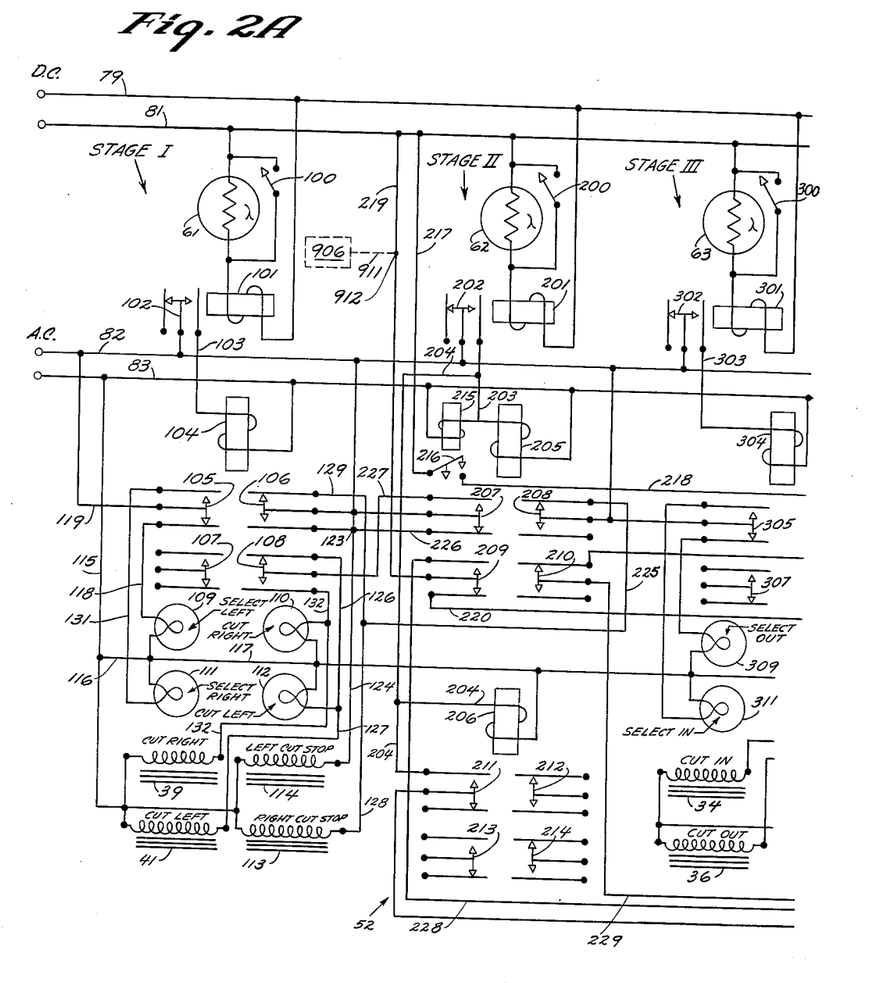
FIG. 2 is a schematic diagram of a portion of the control circuit as constructed in accordance with the teaching of our invention.
Figure 2B:
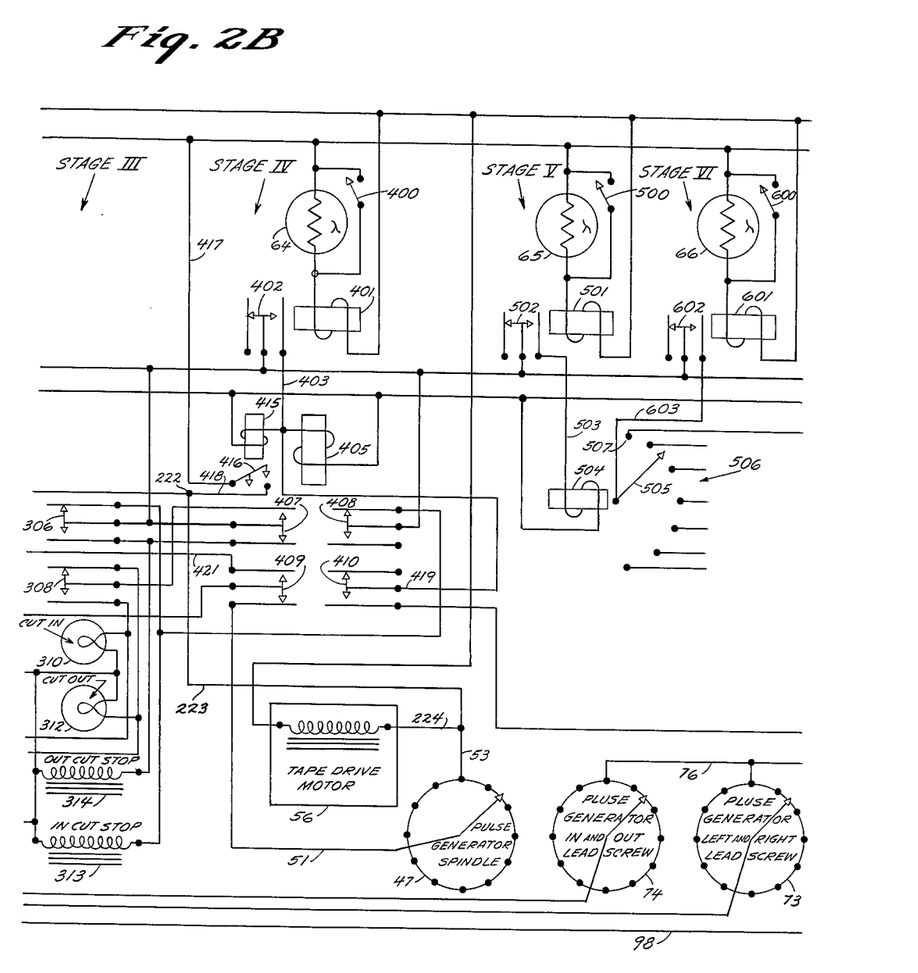
Figure 2C:
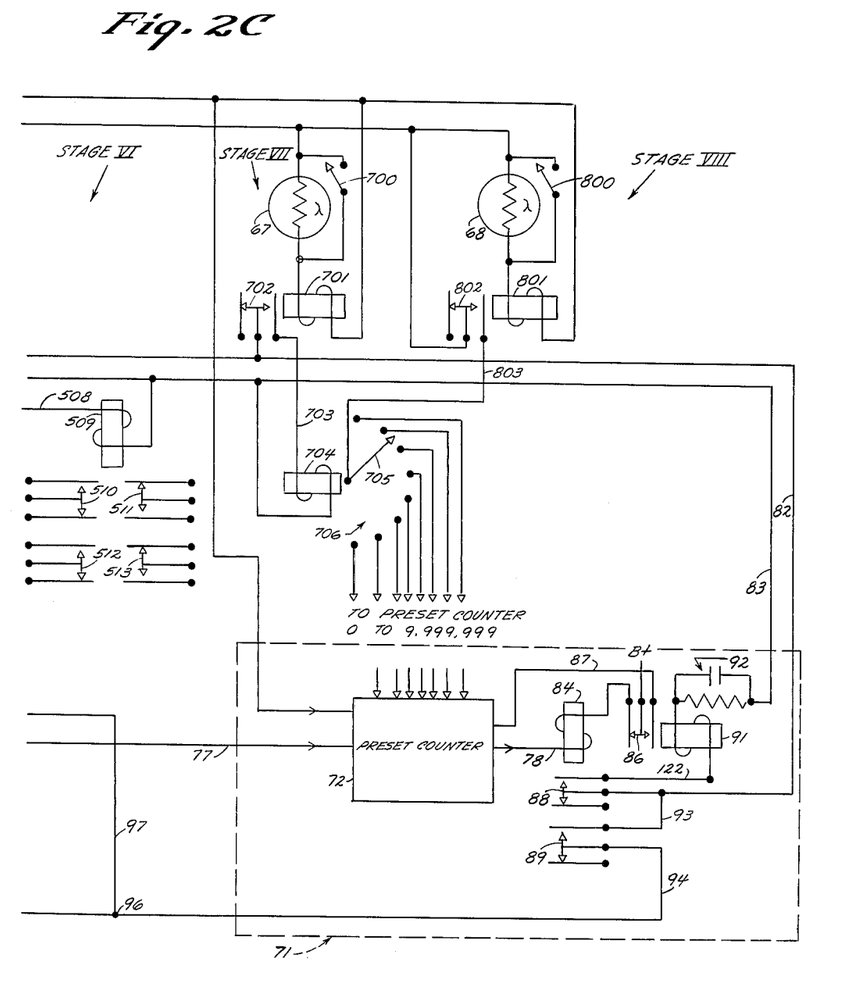

A lead 51 connects the rotary switch 47 to a command circuit, indicated generally at 52 in block form in FIG. 1 and illustrated in detail in FIG. 2. The rotary switch 47 is used as a pulse generator in that upon rotation of the cam wheel 48, the action of the switch 49 produces a number of pulses proportional to the degree of rotation of the spindle shaft 46. Another lead 53 returns the pulses provided by the rotary switch 47 from the command circuit 52, amplifies the pulses at 54, and uses them to energize a synchronous motor 56.

The motor 56 is attached to one of the spools of a tape device 57, either directly as illustrated or through gearing, drive pulley, or other known means, so as to rotate the tape device 57. Thus, by loading the tape device 57 with a record or programmed tape 58, operation of the motor 56 results in the tape 58 being pulled past a pick-up or scanning means 59 at a known rate proportional to the rotational rate of the input drive shaft 20. It should be noted however, that other modes of providing operation of the tape device 57 may be utilized, as will be seen hereinafter. In the particular embodiment employed here, the tape 58 is of a conventional punched type having a minimum of eight columns, each of which contains one or more holes of predetermined location.

From the scanning means 59, which comprises a group of eight photo semi-conductors 61, 62, 63, 64, 65, 66, 67 and 68 (FIG. 2), the coded program data is converted into usable electrical pulses. Certain of these pulses are transmitted through lead 69 to the command circuit 52, and certain others to a comparator circuit indicated generally at 71 in FIG. 1. Within the command circuit 52, as detailed hereinafter, the pulses are utilized as signals to control the actuation and de-actuation of the clutch devices 32 and 33 (FIG. 1) of the gear mechanism 19, connected by leads 30 and 40, respectively, to the command circuit 52, to control the direction of rotation of the lead screw 28. Certain other of the pulses are utilized as signals to start and stop operation of the motor 56 as it is not necessary in this embodiment to run the programmed tape 58 continuously through the command circuit 52.

The arrangement is such that when a cut is started, initiated by the actuation of one of the clutch devices 32 and 33, the circuit to the motor 56 is opened and the tape travel therefore stopped. Subsequently, when the cut is stopped, by de-actuation of the actuated clutch device, the circuit to the motor 56 is closed and the tape travels, the scanning means 59 again feeding further pulses to the command and comparator circuits 52 and 71. The circuitry is designed, however, so that the tape 58 may be run either continuously or intermittently.

Within the comparator circuit 71, certain of the pulses pre-set an electric counter 72 (FIG. 2) as to the number of revolutions of the lead screw 28 necessary to make a particular cut. It will be understood that the initial relationship between the carriage 13 and the table 12 with the work piece will have been included in the programmer's calculations. This number provides a reference number as to the desired longitudinal movement of the table 12, either toward or away from the spindle chuck 17. To provide an accurate determination of the number of revolutions of the lead screw 28, which number is completely independent of any gear movement inaccuracies or backlash in the gearing between the drive motor 15 and the lead screw 28, and further which number is independent of absolute time as compared to machine time, each lead screw 28 and 37 is provided with a rotary switch 73 and 74 similar in structure and function to rotary switch 47.

Each lead screw rotary switch 73 and 74 counts the number of revolutions of its respective lead screw by virtue of its on-off action upon rotation of the lead screw, and thereby acts as a pulse generator. The electric pulses are transmitted through leads 76 and 77, respectively, for the rotary switches 73 and 74 to the comparator circuit 71. There, the pulses from either pulse generator are totalized to produce an electrical effect or number indicative of the position of the respective carriage 13 or table 12, and the number is compared to the reference number in the preset counter 72. When a coincidence subsequently occurs between the reference number and the lead screw number, a command signal results which is transmitted through lead 78 into the command circuit 52 for modifying the operating signals, for example, for the clutch devices 32 and 33 and for the motor 56.

Thus, in brief, the operation of our control apparatus is as follows as to the carriage 13. Rotation of the drive motor 15 results in the drive shaft 20 transmitting drive in opposite directions to both gears 27 and 31 on the lead screw 28. Drive is also imparted to the spindle shaft 46 for rotating a work piece holding chuck 17 and for operating a pulse generator 47.

The pulses from the pulse generator 47 are sent to the command circuit 52, amplified, and by virtue of the setting of the command circuit 52, utilized to drive a motor 56 which in turn operates a tape device 57 to move a programmed tape past the scanner 59. The scanner converts the tape information into usable electric signals which are fed into the command circuit 52 and the comparator circuit 71. Within these circuits the signals perform three main operating functions. First, they set certain switches to produce an electrical effect by presetting a counter 72 with a reference number indicative of the desired amount of travel of the carriage 13 as moved by rotation of the lead screw 28. Second, they actuate equipment to control the operation of the clutch devices 32 and 33 to start rotation of the lead screw in one direction or another thereby controlling the direction of travel of the carriage 13. Third, the operating signals open the circuit to the tape drive motor 56 to stop the tape movement.

As the carriage 13 moves, the rotation of the lead screw 28 is counted by the rotary switch 74 at its end. Acting as a pulse generator, the rotary switch 74 feeds the pulses into the preset counter 72 for counting, totalizing, and comparison with the reference number. When the comparison reaches a coincidence between the reference number and the lead screw number, a command signal is generated which simultaneously initiates three main functions. First, the preset counter 72 is cleared of former reference and counted numbers and reset in effect to zero. Second, the clutch devices 32 and 33 are operated to stop rotation of the lead screw 28. Third, the circuit between the spindle pulse generator 47 and the motor 56 is closed, resulting in the motor 56 operating the tape device 57 to move the programmed tape 58. The step-by-step process is again repeated.

Referring now particularly to FIG. 2, there is illustrated in schematic form a portion of the command and comparator circuits 52 and 71, respectively, in addition to other components of the entire apparatus.

The circuits derive energy from both D.C. lines 79 and 81, and A.C. lines 82 and 83, and can be divided for descriptive purposes into eight stages, indicated generally by Roman numerals in FIG. 2, based on the use of the eight photo semiconductors 61–68, inclusive, which in this instance are cadmium sulfide cells. Stage I comprises the photo cell 61, a manual override switch 100 in parallel therewith, and a plate relay 101 in series, all connected in circuit to the D.C. lines 79 and 81. The photo cell 61, and all like it, continuously conducts a small current through the plate relay 101, but upon being exposed to an increase in light intensity as where a perforation in the tape 58 is scanned by photo cell 61, conducts an increased current sufficient to energize the plate relay 101 whereby a switch 102 changes its illustrated position to conduct A.C. current through a line 103 to a four pole, double throw, flip-flop control relay 104.

The control relay 104 is operable to position four double throw switches 105, 106, 107, and 108. Stage I further includes four light indicator tubes 109, 110, 111, and 112, and four solenoids 39, 41, 113 and 114. As described hereinbefore, solenoids 39 and 41 are a part of the pair of clutch devices of the gear mechanism 18, similar to clutch devices 32 and 33 (FIG. 1), and the energization of which determines the direction of rotation of the lead screw 37, and thus the movement left or right, of the carriage 13 relative to the spindle chuck 17. The solenoids 113 and 114 are used in opposition, in the clutch devices, to the solenoids 39 and 41, respectively. As indicated by the legend in FIG. 2, actuation of solenoids 39 and 41 provide "right" and "left" cuts on the work piece, and actuation of solenoids 113 and 114 ensure the de-actuation of the clutch devices of the gear mechanism 18, whereby drive to the lead screw 37 by the gear mechanism 18 is stopped and a positive stoppage of the cutting movement of the carriage 13 occurs.

Stage II comprises the photo cell 62, a manual override switch 200, a plate relay 201 for operating a switch 202 which transmits A.C. current through lines 203 and 204 to a pair of four pole, double throw, flip-flop power relays 205 and 206. Relay 205 is operable to position four double throw switches 207, 208, 209, and 210; and relay 206 is operable to position four more such switches 211, 212, 213, and 214. Current in line 203 is also transmitted to a delay relay 215 which is subsequent to the operation of relays 205 and 206 to close a normally open switch 216 interposed between lines 217 and 218.

Stage III is identical in number and type of components to Stage I, therefore the Stage III components are numbered the same as those of Stage I in the units and tens, differing only in the hundreds, a three hundred series designation being assigned the Stage III components. It will be noted that solenoids 34 and 36 are designated, as compared to solenoids 39 and 41 of Stage I. These solenoids 34 and 36 operate, respectively, the clutch devices 32 and 33 (FIG. 1) for the longitudinal lead screw 28. As indicated by the legend in FIG. 2, actuation of solenoids 34 and 36 provide "in" and "out" cuts on the work piece, and actuation of solenoids 313 and 314 ensure the de-actuation of the gear mechanism 19 and a stoppage of the cuts.

Stage IV is identical in components to Stage II, with the exception that only one flip-flop power relay 405 and its switches 407, 408, 409, and 410 are provided. The components are numbered the same as to the units and tens as those of Stage II, a four hundred series designation being assigned the Stage IV components.

Stage V includes the photo cell 65, a manual override switch 500, plate relay 501 for actuating a switch 502. Closing of the switch 502 transmits A.C. energy through a line 503 to a control relay 504 which controls the position of the contact arm 505 of a rotary switch 506. The switch 506 includes seven contacts or multiples thereof each connected to respective leads which are connected to various flip-flop relays for performing auxiliary functions of the machine tool. For example, terminal 507 is connected to lead 508 which is adapted to energize flip-flop power relay 509. Energization of the relay 509 in turn determines the position of four double throw switches 510, 511, 512, and 513.

Stage VI includes the photo cell 66, a manual override switch 600, a plate relay 601 operable by the tube 66, and a flip-flop switch 602 operable by the plate relay 601. Movement of the switch 602 from its illustrated position in FIG. 2 connects the stepping switch arm 505 through a lead 603 to the A.C. source. By the arrangement of the Stage V and VI circuitry, pulses initiated by the photo cell 65 in response to the tape program operates the rotary switch 506 to route pulses initiated from the Stage VI photo cell 66 to the relay and switch group 509–513 and other like groups (not shown) for controlling auxiliary functions of the machine tool.

Stages VII and VIII include components, in addition to photo cells 67 and 68, identical to those of Stages V and VI, with like parts indicated by reference numerals alike except for the hundred designation. The rotary switch 706 includes a minimum of eight contacts or any multiple thereof for feeding pulses in the order of units, tens, hundreds, thousands, tens of thousands, hundreds of thousands, and millions into the preset counter 72. Thus, by action of the photo cell 67 in setting the contact arm 705 of the rotary switch 706, pulses from the photo cell 68, picked up from the tape 58, are routed to the preset counter 72 for setting up a reference number therein indicative of the number of pulses to be delivered by either lead screw pulse generator 73 or 74.

It will be noted here that the longitudinal movement of either the carriage 13 or the table 12 is translated into a known number of revolutions of the respective lead screw 28 or 37. Thus, by having a known relationship between the number, whether whole or fractional, of revolutions of each lead screw and the number of pulses generated by each respective pulse generator; upon the receipt, count and coincidence in the preset counter 72 of the pulses generated by pulse generator 74, for example, with the reference number therein, the lead screw 37 has moved the carriage 13 the desired dimensional amount in accord with the command of the program on the tape 58.

The command and comparator circuits 52 and 71, respectively, are completed by the provision of a control relay 84 actuated by current from the preset counter 72 transmitted through the lead 78, a switch 86 adapted in one position to transmit B+ voltage through a lead 87 to the preset counter 72 to clear the counter of the reference number. The preset counter 72 does not form a part of this invention per se and is therefore not illustrated in detail. It does comprise at least one stepping switch connected to a respective contact of the main routing switch 706, a cold cathode glow transfer counter tube for each stepping switch, and the necessary triggering circuit connections and components for emitting a signal through the lead 78 upon a coincidence of the lead screw counted number with the reference number.

The relay 84 controls the position of a pair of two position switches 88 and 89. Switch 88 is adapted in one position to connect A.C. line 82 through a relay 91 and a capacitor resistor circuit 92 in series therewith to the A.C. line 83. Switch 89 is adapted to connect A.C. line 82 through lead 93 to lead 94. Terminal 96 on lead 94 is connected by leads 97 and 98, respectively, to switches 410 and 211.

Stages I and II, therefore, act in response to perforations on the tape 58 to control the actuation and de-actuation of the clutch devices in the gear mechanism 18 for rotating the lead screw 37 in one direction or the other for moving the carriage 13 left or right of the spindle chuck 17.

Stages III and IV act to control the clutch devices 32 and 33 in the gear mechanism 19 for rotating the lead screw 28 in a direction for moving the table 12 in and out relative to the spindle chuck 17.

Stages V and VI act to control auxiliary functions not enumerated herein, and Stages VII and VIII act to control the amount of movement of either lead screw irrespective of direction. In each pair of stages, the first stage acts to prepare, in effect, a route for pulses or current to be transmitted through by action of the second stage to effect a certain result.

To more readily understand the over-all operation of the command and comparator circuits 52 and 71, respectively, a typical sequence of operations to be performed thereby will be described.

Assume the components particularly of Stages I and II are in the positions indicated in FIG. 2. Thus, A.C. energy is transmitted through lines 115, 116, and 117 to the four indicator lights 109–112. It will be seen that only the circuit for the SELECT LEFT indicator 109 is closed through line 118, switch 105 and line 119. Both CUT LEFT solenoid 41 and CUT RIGHT solenoid 39 are de-energized by open circuits, while the circuits for LEFT CUT STOP solenoid 114 and RIGHT CUT STOP solenoid 113 are closed through switches 207 and 106, respectively, to energize these clutch de-actuation solenoids 114 and 113. It will also be noted that D.C. energy is transmitted through line 219, switch 209, line 220, switch 409 and line 51 to the rotary switch 47 for energizing the tape drive motor 56. This action results in the tape 58 being advanced as hereinbefore described.

Assume further that a programmed reference number has been fed into the preset counter 72 as to the number, whether whole or fractional, of revolutions of the lead screw 37 to be made. Operation of photo cell 62 in scanning the moving tape 58 energizes the plate relay 201 and closes the switch 202 so as to transmit current to both relays 205 and 215. Actuation of the relays 205 and 215 changes the position of all their switches 207–214 inclutive, to opposite that illustrated. Thus, the circuit through switch 207 is changed to de-energize LEFT CUT STOP solenoid 114 and to energize, through line 227, switch 108, and line 126, the CUT LEFT indicator 112, and through line 127 the CUT LEFT solenoid 41. The gear mechanism 18 is thus operated to effect a revolution of the lead screw 37 so as to move the carriage 13 to the left relative to the spindle chuck 17.

Simultaneously, the change in position of switch 209 opens the circuit through line 220, switch 409, and line 51 to the rotary switch 47, thus shutting off the current to the tape drive motor 56, and closes the circuit through line 228 to rotary switch 73 at the end of the lead screw 37. With operation of the relay 205, delay relay 215 is subsequently operated, in 0.003 second for example, and closes the switch 216. This transmits A.C. energy through line 218, terminal 222, and lines 223 and 224 to the tape drive motor 56. The power thus transmitted, which is short lived, as explained hereinafter, operates the tape transport device 57 (FIG. 1) sufficiently to move the tape 58 so that all perforations are moved out from beneath all the photo cells.

Thus, operation of the control apparatus has (1) fed a reference number into the comparator circuit preset counter 72 which is indicative of the amount of longitudinal movement of the carriage 13 desired, (2) operated the gear mechanism 18 to effect rotation of the lead screw 37 in a certain direction so as to obtain longitudinal movement of the carriage 13 in the correct direction, (3) placed the pulse generator rotary switch 73 in condition in the control circuitry to accurately record the number of revolutions of the lead screw 37 and to transmit the number through line 77 (FIG. 2) to the preset counter 72 for comparison with the reference number, and (4) opened the circuit to the tape drive motor 56. It should be noted here that the tape drive motor 56 is shut off here merely to conserve the amount of tape 58. As will be clearly seen hereinafter, whether or not the tape is moving during the operation of the machine tool is merely a matter of programming.

When the number of revolutions of the lead screw 37 recorded by the pulse generator 73 and transmitted to the preset counter 72 is in coincidence, as counted by the preset counter 72, with the reference number of revolutions, an electrical signal is emitted from the preset counter 72 through line 78 which energizes the relay 84. This results in a change in the position of the switches 88 and 89, illustrated in FIG. 2 in their normal positions. A.C. energy from line 82 is thus routed through line 122 to the relay 91 where, after a delay of 0.003 second for example, switch 86 is changed to route B+ voltage to the preset counter 72 whereby all switches therein are reset to zero. This results in a cessation of the conduction of current to the relay 84, thereby returning the switches 88 and 89 to their normal positions as illustrated.

During the delayed period, switch 89 in its changed position acts to route A.C. current from line 82 to lines 93 and 94 to terminal 96. From there it is routed in two directions, through line 97 to switch 410, and through line 98 to switch 211. As switch 410 is open, the current is stopped there; however, as switch 211 has been changed in position due to the prior operation of the relay 205, the current is transmitted through the switch 211 and line 204 to both relays 205 and 206.

Actuation of relays 205 and 206 again changes the positions of their respective switches 207–210 and 211–214 back to the illustrated positions. Thus, by virtue of the change the circuit through switch 207, line 226, terminal 123, and line 124 to the LEFT CUT STOP solenoid 114 is closed, and the circuit through switch 207, line 227, switch 108, line 126 to the CUT LEFT indicator 112, and line 127 to the CUT LEFT solenoid 41 are open, de-energizing those components. Furthermore, movement of switch 208 back to its illustrated position transmits current through lines 225 and 128 to the RIGHT CUT STOP solenoid 113, also energized by the switch 106 through lines 129 and 128.

The change of switch 209 back to its illustrated position again directs current through line 220, switch 409, and line 51 to the rotary switch 47, whereby pulses emitted therefrom in response to the rotation of the spindle shaft 46 (FIG. 1) are transmitted to and energize the tape drive motor 56. The tape transport device 57 is again operated to move the tape 58 past the photo cell scanning means 59 for the purpose of feeding the next set of operating signals into the command and comparator circuits 52 and 71. Switch 211 is also back to its illustrated position, the circuit between relays 205 and 206 and switch 89 being open.

Thus, the control apparatus is in the identical condition prior to the operation of the photo cell 62, with the SELECT LEFT indicator 109 on, both LEFT and RIGHT CUT STOP solenoids 41 and 39, respectively, energized, and the rotary switch 47 connected to the tape drive motor 56 for supplying energy thereto to move the tape 58. It should be noted here, that although a driving arrangement between the drive motor 15 and the tape drive motor 56 is disclosed wherein the latter is energized in a known relationship to the former, such is not necessary. Any form of drive means for the tape transport device 57 is satisfactory which is operable, in conjunction with operation of the drive motor 15, to initiate movement of the tape 58, and which is responsive to signals from the command circuit 52 to stop and start the tape transport device 57.

To provide a right cutting operation, where the carriage 13 is moved right of the spindle chuck 17, rather than left, the programmed tape 58 for example need merely present a perforation to the photo cell tube 61. The plate relay 101 acts to close the switch 102 whereby relay 104 is energized to change the position of the flip-flop switches 105–108 to be opposite that illustrated. Switch 105 acts to direct A.C. current through line 131 to the SELECT RIGHT indicator 111. Switch 106 directs current through terminal 123 and line 124 to energize the LEFT CUT STOP solenoid 114, the RIGHT CUT STOP solenoid 113 being energized through lines 128 and 225 and switch 208.

Consequently, upon subsequent activation of the Stage

II photo cell 62, all other action heretofore remaining the same, instead of current being conducted through switch 207 to the CUT LEFT solenoid 41 via switch 108, switch 207 transmits current through line 227, switch 103, line 132 to the CUT RIGHT indicator 110, and line 133 to the CUT RIGHT solenoid 39. With the change of position of the switch 207 to effect the above, switch 208 also changes position to open the circuit through lines 225 and 128 to the RIGHT CUT STOP solenoid 113. The lead screw 37 will therefore be rotated in a direction to move the carriage 13 to the right of the spindle chuck 17 a distance controlled by the count of the pulse generator 73 until a coincidence of the pulse generator count and the reference number occurs within the preset counter 72, with the control apparatus reacting as described hereinbefore.

As the circuitry for Stages III and IV, which control the rotation of lead screw 28 to effect an inward or outward movement of the table 12 and thus the carriage 13 relative to the spindle chuck 17, is substantially the same as the circuitry for Stages I and II, a detailed explanation of the operation of the Stage III and IV circuitry and components is not thought necessary. Of the Stage II switches 211–214 operated by the second power relay 206, only switch 211 was used; as these components are not present in Stage IV, switch 410 performs the same function as switch 211, that is to direct current from switch 89 through line 94—and in the Stage III instance—and lines 97 and 419 to actuate relay 405 to obtain the change of the switches 407–410 back to their illustrated positions subsequent to a lead screw operation.

By the provision of the rotary switches 73 and 74 acting as pulse generators, movement of the cutting tool on the carriage 13 has been controlled by accurate measurement of the driven lead screw, independent of the driving equipment therefor and independent of absolute time as compared to machine time. The pulses are generated by mechanical movement of a cam wheel for each rotary switch 73 and 74, in response to rotation of the particular lead screw, transmitted electrically, and counted electrically by the digital-type preset counter 72.

Illustrated in FIG. 1 is another means of measuring the movement of and determining the position of the cutting tool relative, for example, to movement and position of the table 12 toward and away from the spindle chuck 17.

Referring particularly to FIG. 1, an endless belt of magnetic tape 900 is shown traveling between a pair of pulleys 905 rotatably mounted by conventional means (not shown) on the machine tool base 10. The tape 900 may be a punched tape or the like on which is printed, recorded or scribed in any known manner a series of pulses 901 or the like such as lines or dots at a known number per unit of measurement on the tape 900.

Any means (not shown) may be used for rotating one of the pulleys 905 whereby the tape 900 is moved past a fixed scanning or pickup head 902 secured in a stationary manner to the base 10. The pickup head 902 is capable of picking up the pulses 901 from the tape 900 as the tape moves—at any rate of movement—and of transmitting those pulses through a line 903 and an amplifier 904 to a totalizer circuit 906.

As the table 12 is moved, a movable scanning or pickup head 907 affixed thereto moves with the table 12 and relative to the moving tape 900. The output of the movable pickup head 907 is also fed through a line 908 and an amplifier 909 to the totalizer circuit 906.

It can readily be observed that if the movable pickup head 907 is moved in the same direction as the tape 900, it will record fewer pulses than the number recorded by the fixed pickup head 902; and if the movable pickup head 907 is moved in a direction opposite that of the tape 900, more pulses will be recorded than by the fixed pickup head 902. Within the totalizer circuit 906 and using a conventional counting device such as a stepping mechanism (not shown), the absolute difference between the pulses recorded by the two pickup heads 902 and 907 is the actual amount of travel of the table 12. Thus, within the totalizer circuit 906, the pulses from each pickup head are compared and algebraically added, then fed out in a digital manner through line 911 to the comparator circuit 71, specifically to the preset counter 72.

Within the command and comparator circuits 52 and 71 (FIG. 2), the provision of the tape 900 and its associated parts culminating in the totalizer circuit 906 is illustrated as being connected by the line 911 to a terminal 912 on the Stage II line 219. As the use of the tape 900 would supplant the pulse generator rotary switch 74, the latter would be eliminated and the pulses from the totalizer circuit 906 would be fed, upon activation of the Stage IV photo cell 64, through line 219, switch 209, line 220, switch 409, line 421, switch 210, and lines 229 and 76—connected together by the elimination of the rotary switch 74—to the preset counter 72.

It will of course be understood that the drive arrangement for the tape 900 would not be activated until the gear mechanism 19 was set according to program and the lead screw 28 began to rotate. The rate of linear movement of the tape 900, where the pickup heads 902 and 907 are used as a means for recording the location of the table 12, is immaterial and need not be relative to the rate of rotation of the lead screw 28. As mentioned hereinbefore, the only known factor must be the number of pulses—or the like—per unit of measurement on the tape 900. The programmer can then determine the desired reference number to be fed by the programmed tape 58 to the preset counter 72.

If the tape 900 were moved at a known constant velocity and the movable pickup head 907 moved also at a known constant velocity by the lead screw 28, the distance traveled by the table 12 could be accurately calculated. The accuracy of the calculation would be determined by the pulse rate of the tape 900 and the velocity of the movable pickup head 907.

Although the tape 900 and associated parts are shown only for recording the movement of the table 12, and thus supplanting the rotary switch 74, the same arrangement could also be applied to recording the movement of the carriage 13, and thus supplanting the rotary switch 73. Within the circuits 52 and 71 (FIG. 2) the additional pulse generator of the tape 900 type would also be fed into the Stage II line 219. Thus, upon activation of the Stage II photo cell 62, the pulses from movement of the carriage 13 would be fed through line 219, switch 209, and lines 228 and 77—connected together by the elimination of rotary switch 74—to the preset counter 72. Further description is not thought necessary.

A modification of the tape 900 arrangement is the use of the tape 900 as a stationary strip having the pulses 901 placed thereon in any one of several known manners, and wherein the stationary pickup head 902 is eliminated, with the movable pickup head 907 adapted to read and record the number of pulses from the stationary tape 900. Thus, in direct proportion to the movement of the table 12, or the carriage 13 as the case may be, should the modification be applied thereto, the moving pickup head 907 records the pulses on the stationary strip 900, amplifies them at 909, and by-passing the totalizer circuit 906 as unnecessary, transmits the pulses directly through line 911 to the preset counter 72. At the counter 72, the pulses are counted and compared to the reference number exactly as was the case with the rotary switch pulses.

In summation, automatic control apparatus has been described herein which is simple, comprised of standard components, and easily serviced by technician-type personnel. The apparatus provides automatic control for a machine tool without the need of binary computers and other sophisticated equipment, and control is provided based on machine time and movement of the cutting tool itself, independent of the gearing therefor.

Although a preferred embodiment and several modifications thereof have been disclosed herein, it is to be remembered that various changes and modifications can be made thereto within the scope of the invention as defined in the appended claims.

We claim:

1. Apparatus for the control of the movement of a movable element of a machine tool, relative to a stationary element and having a drive shaft, comprising in combination:
   (a) a driven shaft for said movable element,
   (b) means operable by signals for transmitting drive from said drive shaft to said driven shaft,
   (c) program means for supplying a reference basis for the controlled movement of the movable element, said program means including a series of readable signals,
   (d) means for picking up and transmitting said signals,
   (e) control circuit means for receiving said signals and transforming them into operating signals for said transmitting means and into reference pulses of a predetermined number,
   (f) means for supplying a reference basis for the movement of the movable element, said means including readable information having a known relationship to said reference pulses,
   (g) a first detector mounted on said movable element for coaction with said information means and adapted to produce a plurality of pulses in response to movement of said movable element;
   a second detector mounted on said stationary element element for coaction with said information means and adapted to produce a plurality of pulses in response to movement of said information means,
   (h) means for totalizing said movement pulses,
   (i) means for camparing the number of said movement pulses to the number of reference pulses for producing an output signal when said numbers are in coincidence, and
   (j) means responsive to the output signal for modifiying said operating signals.

2. Apparatus for the control of the movement of a movable element relative to a stationary element, comprising in combination:
   (a) a drive shaft,
   (b) a driven shaft for said movable element,
   (c) means for transmitting drive from said drive shaft to said driven shaft including a pair of electrically controlled clutch devices, one clutch device operable upon actuation to rotate said driven shaft in one direction and the other clutch device operable upon actuation to rotate said driven shaft in the opposite direction,
   (d) program means having pre-arranged signals for supplying a reference basis for the controlled movement of the movable element,
   (e) means for operating said program means,
   (f) photo-electric means including a plurality of photoelectric cells for scanning said program means, each cell capable of picking up signals from said program means,
   (g) counting mechanism responsive to certain of said signals for presetting a desired number of revolutions of said driven shaft,
   (h) first switch means responsive to certain of said signals for preparing a circuit route to said clutch means,
   (i) second switch means responsive to certain of said signals for closing said circuit route and for transmitting current therethrough for actuating said clutch means, said second switch means responsive to said command signal for stopping the transmission of current to said clutch means for stopping the rotation of said driven shaft,
   (j) means including readable information for supplying a reference basis for the movement of the movable element,
   (k) a first detector mounted on said movable element for coaction with said information means and adapted to produce a plurality of pulses in response to movement of said movable element;
   a second detector mounted on said stationary element for coaction with said information means and adapted to produce a plurality of pulses in response to movement of said information means,
   (l) means for totalizing the number of said movement pulses,
   (m) said counting mechanism operable to compare said totalized number to said preset number and to emit a command signal upon coincidence thereof,
   (n) said second switch means responsive to said command signal for opening said circuit route to stop rotation of said driven shaft, and for actuating said program operating means, and
   (o) means responsive to said command signal for resetting said counting mechanism to zero.

3. Apparatus for the control of the movement of a movable element relative to a stationary element comprising in combination:
   (a) means for moving said movable element,
   (b) program means for supplying a reference basis for the controlled movement of the movable element, said program means including switches settable to produce a first electrical effect indicative of a desired position for said movable element,
   (c) means mounted on said stationary element, for carrying signals,
   (d) a first detector mounted on said movable element for coaction with said signal carrying means and adapted to produce a plurality of pulses in response to movement of said movable element,
   a second detector mounted on said stationary element for coaction with said signal carrying means and adapted to produce a plurality of pulses in response to movement of said signal carrying means,
   (e) means for totalizing said pulses to produce a second electrical effect indicative of the instantaneous position of said movable element, and
   (f) means for comparing said first and second electrical effects for controlling said movement means and arresting movement of said movable element when said desired and instantaneous positions correspond.

4. Apparatus for the control of the movement of a movable element relative to a stationary element, comprising in combination:
   (a) a drive member,
   (b) a driven member for moving said movable element,
   (c) signal controlled means for transmitting drive from said drive member to said driven member,
   (d) program means for supplying a reference basis for the controlled movement of the movable element, said program means including a programmed tape having pre-arranged signals,
   (e) means for operating said program means to move said tape,
   (f) means for picking up the pre-arranged signals from said tape,
   (g) means for conducting certain of said signals as operating signals to said signal controlled means for actuation thereof,
   (h) means for receiving certain of said signals for presetting a reference number of pulses indicative of the linear movement of said movable element,
   (i) means including readable information having a known relationship to said signals for supplying a reference basis for the movement of the movable element,
   (j) a first detector mounted on said movable element for coaction with said information means and adapted to produce a plurality of pulses in response to movement of said movable element, a second detector mounted on said stationary element for coaction with said information means and adapted to produce a plurality of pulses in response to movement of said information means, (k) means for receiving, totalizing, and comparing said detector means pulses to said reference number and for emitting a command signal when coincidence occurs therebetween, and (l) means responsive to said command signal for modifiying said operating signals whereby said signal controlled means stops transmitting drive in accord with the position of said movable element.

References Cited by the Examiner

UNITED STATES PATENTS

| | | | |
|---|---|---|---|
| 2,114,835 | 4/38 | Fauquet | 310—101 X |
| 2,484,968 | 10/49 | Sponaugle | 318—28 |
| 2,906,900 | 9/59 | Cohen et al. | 310—101 |
| 2,926,335 | 2/60 | Bower. | |
| 2,927,258 | 3/60 | Lippel | 318—162 X |
| 2,943,251 | 6/60 | Hull | 318—162 |
| 2,947,929 | 8/60 | Bower. | |
| 3,015,806 | 1/62 | Wang et al. | 318—162 X |
| 3,069,608 | 12/62 | Forrester et al. | 318—28.51 |

FOREIGN PATENTS 829,824    3/60    Great Britain.

ORIS L. RADER, *Primary Examiner.*